United States Patent
Hanano (10) Patent No.: US 11,345,085 B2
(45) Date of Patent: May 31, 2022

(54) METHOD OF PRODUCING OPTICAL ELEMENT AND APPARATUS FOR PRODUCING OPTICAL ELEMENT

(71) Applicant: OLYMPUS CORPORATION, Hachioji (JP)

(72) Inventor: Kazunari Hanano, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 369 days.

(21) Appl. No.: 16/205,757

(22) Filed: Nov. 30, 2018

(65) Prior Publication Data

US 2019/0091928 A1    Mar. 28, 2019

Related U.S. Application Data

(63) Continuation of application No. PCT/JP2016/066784, filed on Jun. 6, 2016.

(51) Int. Cl.
*B29C 64/393* (2017.01)
*B33Y 50/02* (2015.01)
*B29C 64/209* (2017.01)
*B29D 11/00* (2006.01)
*B29C 64/106* (2017.01)
(Continued)

(52) U.S. Cl.
CPC ......... *B29C 64/209* (2017.08); *B29C 64/106* (2017.08); *B29C 64/112* (2017.08); *B29C 64/393* (2017.08); *B29D 11/00009* (2013.01); *B29D 11/00432* (2013.01); *B29L 2011/0016* (2013.01); *B33Y 10/00* (2014.12);
(Continued)

(58) Field of Classification Search
CPC ... B29C 64/106; B29C 64/112; B29C 64/209; B29C 64/393; B29D 11/00009; B29D 11/00432; B29L 2011/0016; B33Y 10/00; B33Y 30/00; B33Y 50/02
See application file for complete search history.

(56) References Cited

U.S. PATENT DOCUMENTS 5,801,722 A * 9/1998 Ueda .................. B41J 29/393
347/14
6,164,850 A * 12/2000 Speakman ............ B29C 64/112
400/120.09
(Continued)

FOREIGN PATENT DOCUMENTS

JP    2000296561 A    10/2000
JP    2002067174 A    3/2002
(Continued)

OTHER PUBLICATIONS

English Language Translation of International Preliminary Report on Patentability (IPRP) and Written Opinion dated Dec. 20, 2018 issued in International Application No. PCT/JP2016/066784.
(Continued)

*Primary Examiner* — Yuhui R Pan
(74) *Attorney, Agent, or Firm* — Holtz, Holtz & Volek PC (57) ABSTRACT

A method of producing an optical element includes forming a base portion that supports a curved surface of the optical element by discharging a transmissive material that allows transmission of light in a first amount, and forming the curved surface by discharging, to the base portion, the transmissive material in a second discharge amount smaller than the first discharge amount.

12 Claims, 10 Drawing Sheets

(51) Int. Cl.
*B29C 64/112* (2017.01)
*B33Y 10/00* (2015.01)
*B33Y 30/00* (2015.01)
*G02B 3/00* (2006.01)
*B29L 11/00* (2006.01)
*G02B 1/04* (2006.01)

(52) U.S. Cl.
CPC ............... *B33Y 30/00* (2014.12); *B33Y 50/02* (2014.12); *G02B 1/041* (2013.01); *G02B 3/00* (2013.01)

(56) References Cited

U.S. PATENT DOCUMENTS

| | | | |
|---|---|---|---|
| 6,505,089 B1 | 1/2003 | Yang et al. | |
| 2002/0029094 A1 | 3/2002 | Koreishi | |
| 2004/0135276 A1 | 7/2004 | Nielsen et al. | |
| 2005/0015173 A1* | 1/2005 | Ohmori | B33Y 40/00 700/119 |
| 2011/0282482 A1* | 11/2011 | Knighton | B29C 64/188 700/111 |
| 2012/0019936 A1* | 1/2012 | Blessing | C09D 11/101 359/742 |
| 2016/0311162 A1* | 10/2016 | Liu | B29C 64/112 |

FOREIGN PATENT DOCUMENTS

| | | |
|---|---|---|
| JP | 2006515813 A | 6/2006 |
| JP | 2009083326 A | 4/2009 |
| WO | 03016031 A1 | 2/2003 |

OTHER PUBLICATIONS

International Search Report (ISR) dated Aug. 30, 2016 issued in International Application No. PCT/JP2016/066784.
Written Opinion dated Aug. 30, 2016 issued in International Application No. PCT/JP2016/066784.

* cited by examiner

METHOD OF PRODUCING OPTICAL ELEMENT AND APPARATUS FOR PRODUCING OPTICAL ELEMENT

CROSS-REFERENCE TO RELATED APPLICATIONS

This application is a Continuation Application of PCT Application No. PCT/JP2016/066784, filed Jun. 6, 2016, the entire contents of all of which are incorporated herein by reference.

FIELD

Embodiments described herein relate to a method of producing an optical element, and to an apparatus for producing the optical element.

BACKGROUND

A so-called 3D printer has been put to practical use. The 3D printer produces a three-dimensional object by discharging, from a nozzle, a resin material curable when irradiated with ultraviolet light or the like, and irradiating the discharged droplets with ultraviolet light. For example, Jpn. Pat. Appln. KOKAI Publication No. 2000-296561 discloses the modeling apparatus as a 3D printer.

It is expected that the 3D printer produces a three-dimensional object requiring a fine shape such as an optical element. For example, if the amount of droplets discharged from the nozzle is reduced, a three-dimensional object requiring a fine shape can be produced. However, if the amount of droplets discharged is small, the number of times droplets are discharged that are needed to form a three-dimensional object is increased. As a result, there is a problem that the time required for producing the three-dimensional object increases.

SUMMARY

An object of the present invention is to provide a method of producing an optical element and an apparatus for producing an optical element that can achieve both high shape accuracy and shortening of time required for production.

A method of producing an optical element according to an embodiment includes forming a base portion that supports a curved surface of the optical element by discharging a transmissive material that allows transmission of light in a first amount, and forming the curved surface by discharging, to the base portion, the transmissive material in a second discharge amount smaller than the first discharge amount.

According to the present invention, it is possible to provide a method of producing an optical element and an apparatus for producing an optical element that can achieve both high shape accuracy and shortening of time required for production.

DETAILED DESCRIPTION

In the following, a detailed description will be given of a method of producing an optical element and a method of producing an imaging apparatus.

In the present embodiment, an optical element of a lens unit for use in an imaging apparatus is formed by a so-called 3D printer that produces a three-dimensional object based on three-dimensional data. Hereinafter, an ink-jet type 3D printer that forms a three-dimensional object by discharging liquid resin that is curable by light (for example, ultraviolet light) and curing the resin with ultraviolet light is described as an example of a 3D printer. However, a 3D printer is not limited to this ink-jet type. A 3D printer may adopt any modeling method as long as it discharges liquid resin.

In the present embodiment, a 3D printer forms an optical element portion of a lens unit from a light-transmitting resin material (transmissive material).

In the present embodiment, three-dimensional data is shape data in a three-dimensional space having a width, a depth, and a height. Hereinafter, for example, a width direction is represented as an X direction, a depth direction is represented as a Y direction, and a height direction is represented as a Z direction. Shape data includes information on a material for each coordinate determined by the position in the X direction, the position in the Y direction, and the position in the Z direction. Information on the material indicates, for example, the amount of transmissive material discharged. The three-dimensional data may be data obtained by converting data such as 3D-CAD data or 3D-CG data in accordance with the resolution of the 3D printer.

First Embodiment

Figure 1:
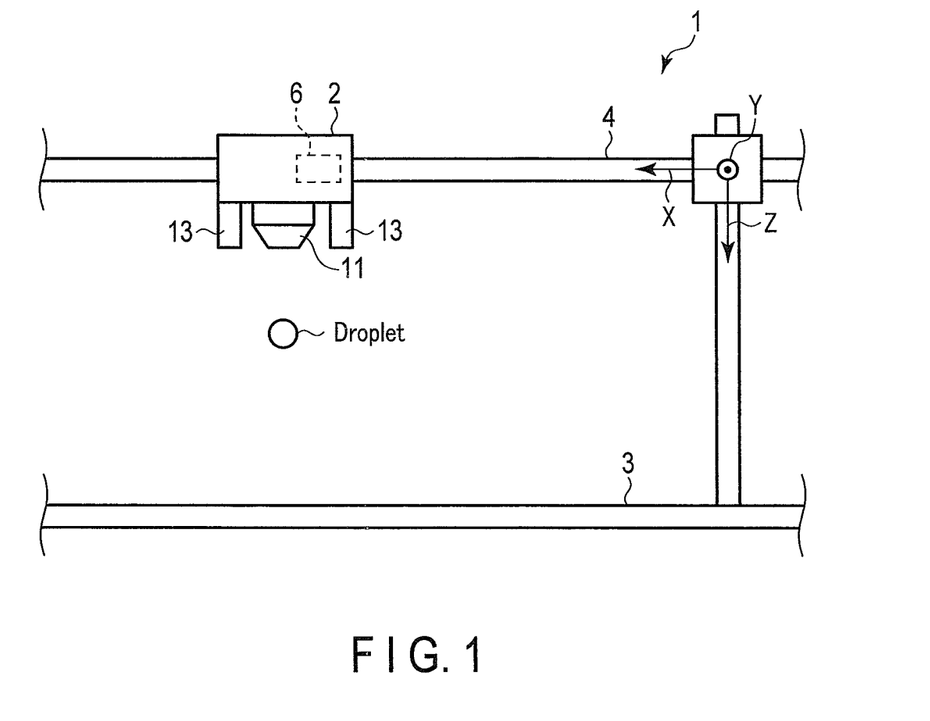
FIG. 1 is a view to explain an example of a 3D printer according to one embodiment.

FIG. 1 is an explanatory drawing to explain an example of a 3D printer 1 according to the first embodiment. The 3D printer 1 is an apparatus for producing an optical element. The 3D printer 1 includes a pint head 2, a stage 3, a positioning mechanism 4, and a controller 6.

The print head 2 discharges liquid resin as droplets. The pint head 2 includes a variable nozzle 11, and an ultraviolet-rays lamp 13. The print head 2 further includes a pressure chamber (not shown) filled with a transmissive material. For example, the print head 2 controls the pressure in the pressure chamber in accordance with the three-dimensional data to send out the liquid resin in the pressure chamber to the variable nozzle 11.

The variable nozzle 11 discharges, as droplets, the transmissive material in the pressure chamber. The variable nozzle 11 includes an opening that discharges the resin extruded from the pressure chamber, and an opening/closing mechanism for switching the area of the opening. The variable nozzle 11 causes the opening/closing mechanism to deform the shape of the opening to thereby switch the area of the opening. For example, the variable nozzle 11 switches the area of the opening between a first opening area and a second opening area smaller than the first opening area. In this manner, the variable nozzle 11 switches the amount of droplets to be discharged from the opening between a first discharge amount and a second discharge amount.

The ultraviolet-rays lamp 13 irradiates droplets discharged from the variable nozzle 11 with ultraviolet light so that the droplets cure to form a partial structure (referred to as a resin structure) of a three-dimensional object. The ultraviolet-rays lamp 13 may be configured to output ultraviolet light when droplets are discharged from the variable nozzle 11, or may be configured to constantly output ultraviolet light. The layout of the ultraviolet-rays lamp 13 in the print head 2 is determined so that ultraviolet light sufficiently irradiates the droplets discharged from the nozzle.

The stage 3 is a member that holds droplets discharged from the print head 2. The stage 3 includes a molding surface formed flushly.

The positioning mechanism 4 determines a landing position of droplets discharged from the print head 2 by moving the print head 2. For example, the positioning mechanism 4 adjusts a landing position of droplets within a surface parallel to the molding surface of the stage 3 by moving the print head 2 in the width direction (corresponding to the X direction) parallel to the molding surface of the stage 3, and the depth direction (corresponding to the Y direction). The positioning mechanism 4 adjusts a distance between the molding surface of the stage 3 and the print head 2 by moving the print head 2 in the direction (corresponding to the Z direction) orthogonal to the molding surface of the stage 3.

The controller 6 controls the operation of each unit of the 3D printer 1. For example, the controller 6 is configured to communicate with the print head 2 and the positioning mechanism 4, and controls operations of the print head 2 and the positioning mechanism 4. In the example of FIG. 1, the controller 6 is provided integrally with the print head 2, but may be provided at any location as long as it can communicate with the print head 2 and the positioning mechanism 4.

The controller 6 acquires three-dimensional data, and moves the print head 2 by means of the positioning mechanism 4 in accordance with the three-dimensional data acquired while causing the print head 2 to discharge droplets. Moreover, the pressure in the pressure chamber is controlled to send out the liquid resin in the pressure chamber to the variable nozzle 11. The controller 6 determines whether droplets are discharged in the first discharge amount or the second discharge amount from the variable nozzle 11, and according to a result of the determination, switches the amount of droplets discharged from the variable nozzle 11 between the first discharge amount and the second discharge amount.

The 3D printer 1 with the aforementioned configuration forms layers of the resin structure by moving the print head 2 in the X direction and the Y direction by means of the positioning mechanism 4 while discharging droplets from the print head 2 to the stage 3. Specifically, the 3D printer 1 moves the print head 2 by the positioning mechanism 4 to a position corresponding to coordinates of three-dimensional data. Furthermore, the 3D printer 1 determines the amount of droplets discharged according to the shape data of the coordinates. For example, according to the shape date for each coordinate, the 3D printer 1 determines whether to discharge no droplets, discharge droplets in the first discharge amount, or discharge droplets in the second discharge amount, and according to a result of this determination, the 3D printer 1 operates the print head 2. That is, the 3D printer 1 forms layers while switching the amount of droplets to be discharged between the first discharge amount and the second discharge amount according to the three-dimensional data. The 3D printer 1 forms resin layers while moving the print head 2 in the Z direction through the positioning mechanism 4, thereby forming a three-dimensional object with a stacked structure in which the aforementioned layers are stacked.

In order to form a resin structure in a position apart in the Z direction from the molding surface of the stage 3, a supporting member to support droplets is required. The supporting member may be a resin structure one layer below, or may be any object placed on the molding surface of the stage 3.

Figure 2:
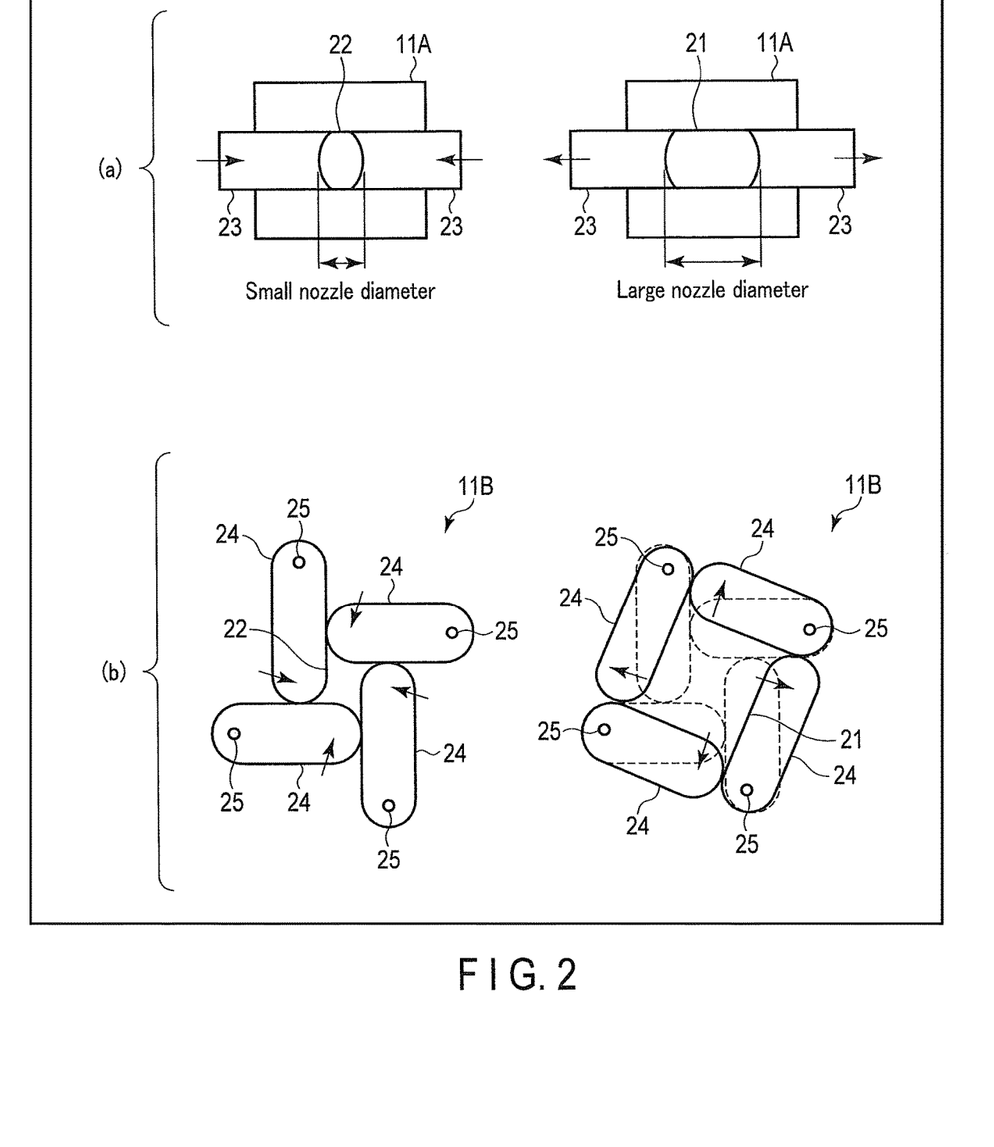
FIG. 2 is a view to explain a configuration example of a variable nozzle according to one embodiment.

FIG. 2 is a drawing showing a configuration example of a distal end of the variable nozzle 11. FIG. 2(a) shows a configuration example of a variable nozzle 11A which is an example of the variable nozzle 11. FIG. 2(b) shows a configuration example of a variable nozzle 11B which is an example of the variable nozzle 11.

As shown in FIG. 2(a), the variable nozzle 11A includes a pair of sealing plates 23 as an opening/closing mechanism. The pair of sealing plates 23 forms at least a part of the opening. A predetermined curvature may be set for sides forming the opening of the pair of sealing plates 23. The pair of sealing plates 23 is driven in directions opposite to each other by a driving mechanism (not shown), thereby increasing or decreasing the area of the opening. For example, the pair of sealing plates 23 is driven by the driving mechanism in directions approaching each other, thereby decreasing the area of the opening. The pair of sealing plates 23 is driven by the driving mechanism in directions away from each other, thereby increasing the area of the opening. Specifically, the variable nozzle 11A drives the pair of sealing plates 23 in directions away from each other to form an opening 21 having a first opening area. The variable nozzle 11A drives the pair of sealing plates 23 in directions approaching each other to form an opening 22 having a second opening area.

As shown in FIG. 2(b), the variable nozzle 11B includes a plurality of sealing plates 24 as an opening/closing mechanism. For example, the variable nozzle 11B includes four sealing plates 24. The four sealing plates 24 form an opening. The sealing plates 24 are rotated and driven about rotation axes 25 by a driving mechanism (not shown), thereby increasing or decreasing the area of the opening. For example, the four sealing plates 24 are rotated and driven by the driving mechanism in a direction in which they close the opening, thereby reducing the area of the opening. The four sealing plates 24 are rotated and driven by the driving mechanism in a direction in which they open the opening, thereby increasing the area of the opening. Specifically, the variable nozzle 11B drives each of the four sealing plates 24 in a direction in which they close the opening, thereby forming the opening 21 having the first opening area. Also, the variable nozzle 11B drives each of the four sealing plates 24 in a direction in which they open the opening, thereby forming the opening 22 having the second opening area.

Figure 3:
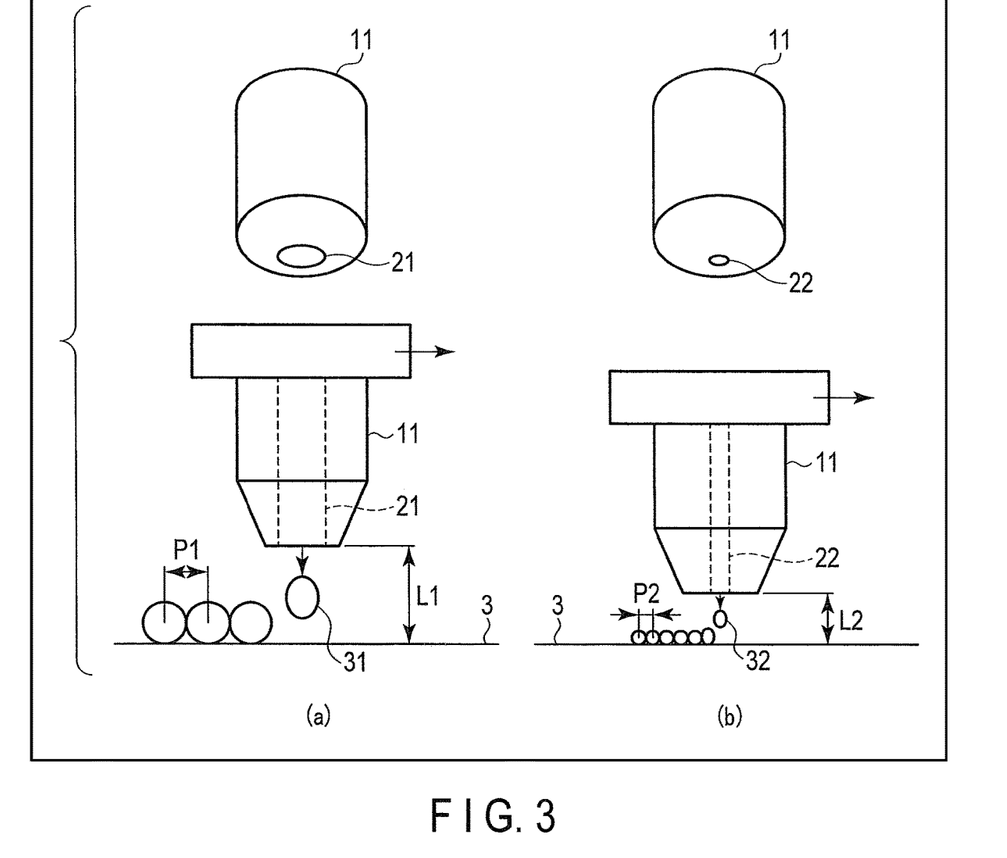
FIG. 3 is a view to explain a configuration example of the variable nozzle according to one embodiment.

FIG. 3 is an explanatory drawing to explain the positional relationship of the variable nozzle 11 of the head print head 2. FIG. 3(a) is an explanatory drawing to explain the positional relationship between the variable nozzle 11 provided with the opening 21 having the first opening area and the molding surface of the stage 3. FIG. 3(b) is an explanatory drawing to explain the positional relationship between the variable nozzle 11 provided with the opening 22 having the second opening area and the molding surface of the stage 3.

The 3D printer 1 changes, in accordance with the amount of droplets discharged, the amount of movement made by the positioning mechanism. 4 when the variable nozzle 11 of the print head 2 is moved within the plane parallel to the molding surface of the stage 3. Furthermore, in accordance with the amount of droplets discharged, the 3D printer 1 changes, by means of the positioning mechanism 4, the distance between the variable nozzle 11 of the print head 2 and the landing position of droplets in the direction orthogonal to the molding surface of the stage 3.

For example, as shown in FIG. 3(a), if the variable nozzle 11 is provided with the opening 21 having the first opening area, the 3D printer 1 moves the variable nozzle 11 to a position in which a distance between the variable nozzle 11 and the droplet landing position is a first distance L1. If the variable nozzle 11 is provided with the opening 21 having the first opening area, the 3D printer 1 discharges the first discharge amount of droplets 31 from the variable nozzle 11 while moving the variable nozzle 11 in the X direction or the Y direction by the first interval P1 corresponding to the first resolution. That is, if the 3D printer discharges the first discharge amount of droplets 31 from the variable nozzle 11, the amount of movement of the print head 2 made by the positioning mechanism 4 is set so that the minimum interval of the landing position of droplets 31 discharged from the variable nozzle 11 becomes a first interval P1 corresponding to the first resolution.

For example, as shown in FIG. 3(b), if the variable nozzle 11 is provided with the opening 22 having the second opening area, the 3D printer 1 moves the variable nozzle 11 to a position in which the distance between the variable nozzle 11 and the droplet landing position is a second distance L2 that is shorter than the first distance L1. If the variable nozzle 11 is provided with the opening 22 having the second opening area, the 3D printer 1 discharges the second discharge amount of droplets 32 from the variable nozzle 11 while moving the variable nozzle 11 in the X direction or the Y direction by the second interval P2 corresponding to the second resolution that is finer than the first resolution. That is, if the 3D printer discharges the second discharge amount of droplets 32 from the variable nozzle 11, the amount of movement of the print head 2 made by the positioning mechanism 4 is set so that the minimum interval of the landing positions of droplets 32 discharged from the variable nozzle 11 becomes a second interval P2 corresponding to a second resolution and narrower than the first interval P1.

The vertical fluctuation of the print head 2 caused when the print head 2 is moved increases in accordance with the movement distance in the X direction or the Y direction. However, as described above, if the print head 2 is moved at the first interval P1 wider than the second interval P2, the print head 2 is positioned so that the distance between the variable nozzle 11 and the droplet landing position becomes the first distance L1 longer than the second distance L2, thereby preventing the variable nozzle 11 from coming into contact with the resin structure due to the vertical fluctuation of the print head 2.

The relationship of the first interval P1 and the first distance L1 when the variable nozzle 11 is provided with the opening 21 having the first opening area to the second interval P2 and the second distance L2 when the variable nozzle 11 is provided with the opening 22 having the second opening area desirably satisfies $0.5<(P1/L1)/(P2/L2)<2$. Furthermore, it is desirable that the first opening area is, for example, approximately 10 times larger than the second opening area. If the first opening area is approximately 10 times larger than the second opening area, it is possible to achieve both a case where emphasis is placed on stacking time and a case where emphasis is placed on shape accuracy.

Next, a specific method of producing the optical element 5 according to the first embodiment will be described with reference to FIG. 4 to FIG. 6. The 3D printer 1 discharges droplets from the variable nozzle 11 while moving the print head 2 in the X direction and the Y direction, and forms layers of the transparent resin structure on stage 3. The 3D printer 1 stacks layers of the resin structure while moving the print head 2 in the Z direction to thereby form the optical element 5 including a base portion 41 and a surface portion 42.

The base portion 41 is a portion that holds the surface portion 42 constituting a curved surface 43 formed on the most distal side of the optical element 5. The surface portion 42 is formed at the distal side relative to the base portion 41 of the optical element 5, and the surface constitutes the curved surface 43. In the surface portion 42, since the shape accuracy of the curved surface 43 affects the optical characteristics of the optical element 5, higher shape accuracy is required in comparison to the base portion 41.

The shape accuracy of the resin structure is determined according to the amount of droplets discharged from the variable nozzle 11. That is, it becomes easier to form a fine resin structure by reducing the discharge amount rather than increasing the discharge amount. Therefore, if a resin structure is formed from the second discharge amount of droplets 32, the 3D printer 1 can form a resin structure with higher shape accuracy in comparison to when a resin structure is formed from the first amount of droplets 31.

The formation speed of the resin structure is determined according to the amount of droplets discharged from the variable nozzle 11. That is, if the discharge amount is reduced, it takes time to form the resin structure. Therefore, when a resin structure is formed from the first discharge amount of droplets 31, the 3D printer 1 can form a resin structure faster in comparison to when a resin structure is formed from the second discharge amount of droplets 32.

The 3D printer 1 controls the operations of the print head 2 and the positioning mechanism 4 so as to form the base portion 41 from the first discharge amount of droplets 31, and controls the operations of the print head 2 and the positioning mechanism 4 so as to form the surface portion 42 having the curved surface 43 from the second discharge amount of droplets 32.

Specifically, while moving the print head 2 by the positioning mechanism 4, the 3D printer 1 discharges the first discharge amount of droplets 31 from the variable nozzle 11 when the print head 2 reaches a position in which the print head 2 is to form the base portion 41 of the optical element 5. Moreover, while moving the print head 2 by the positioning mechanism 4, the 3D printer 1 discharges the second discharge amount of droplets 32 from the variable nozzle 11 when the print head 2 reaches a position in which the print head 2 is to form the surface portion 42 having the curved surface 43.

Figure 4:
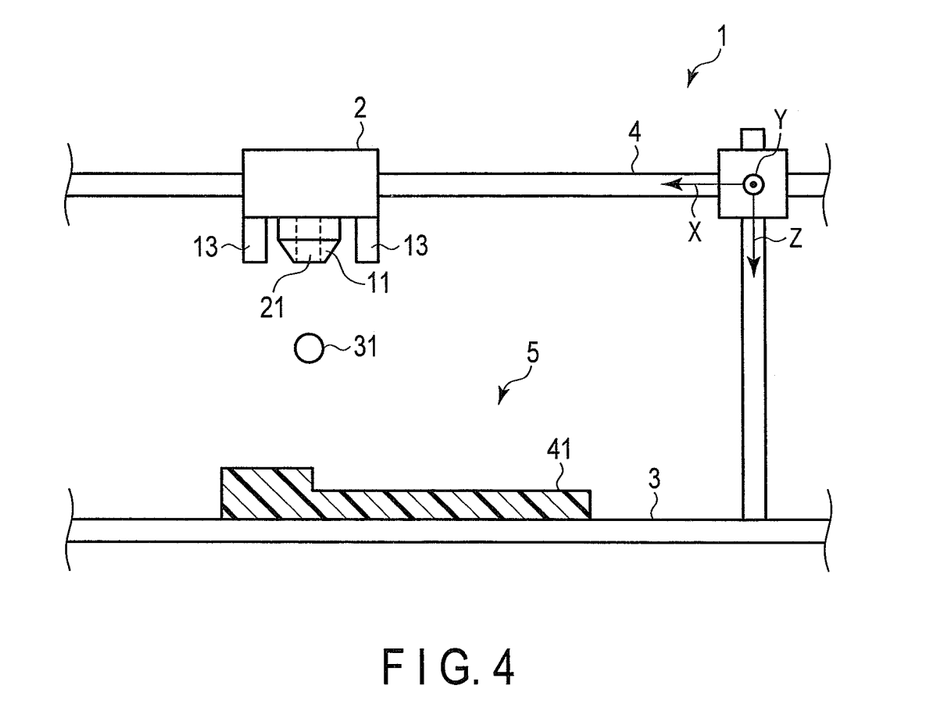
FIG. 4 is view to explain an example of a step of forming a part of a base portion of the optical element according to one embodiment.
Figure 5:
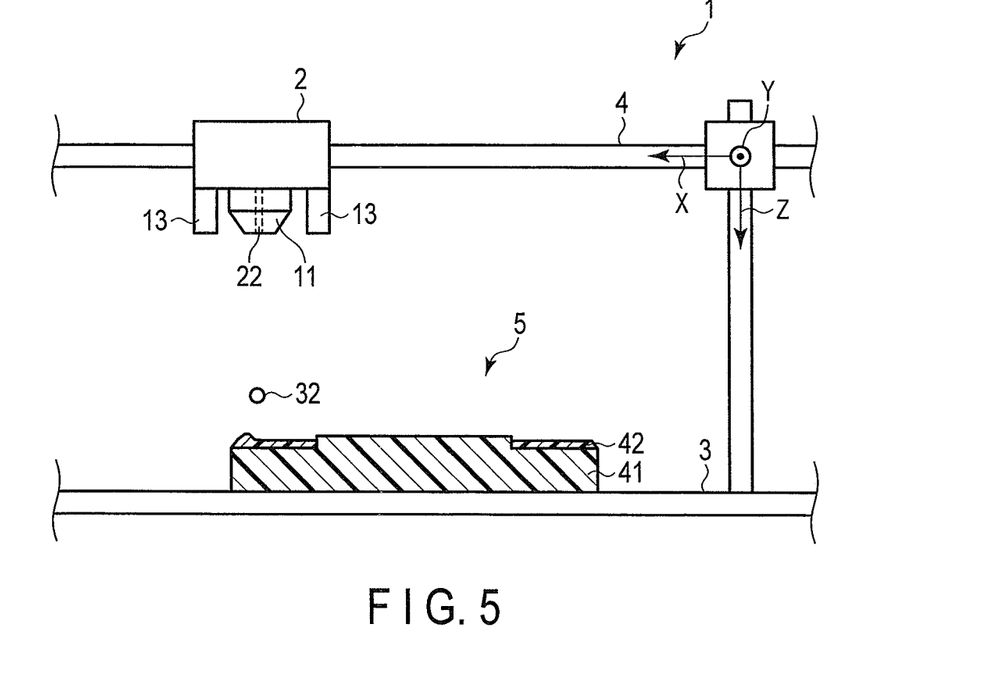
FIG. 5 is a view to explain an example of a step of forming a part of a surface portion of the optical element according to one embodiment.
Figure 6:
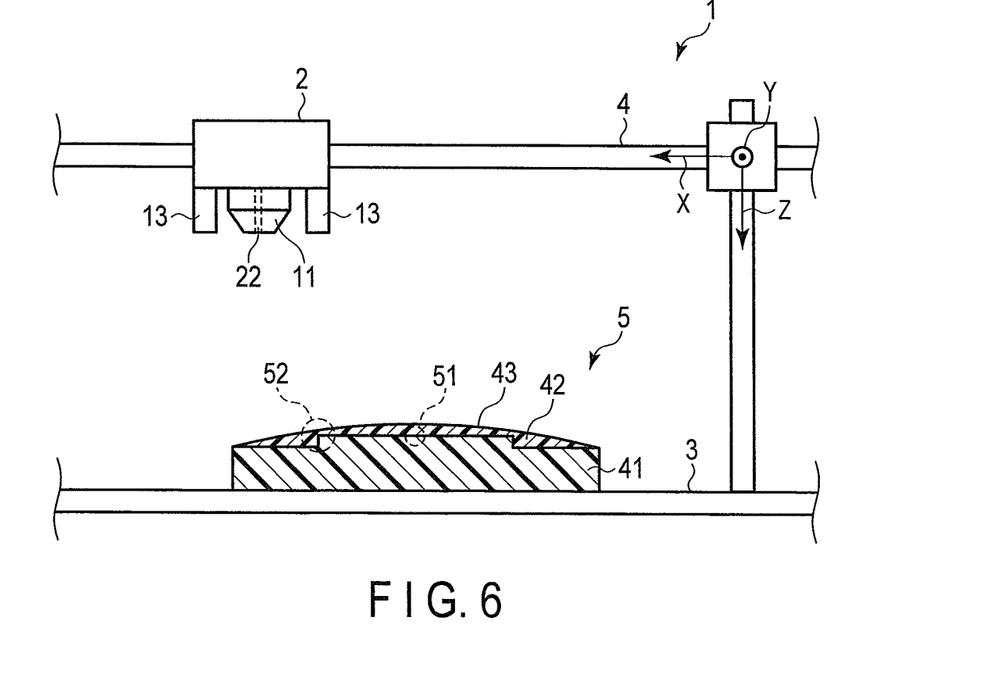
FIG. 6 is a view to explain an example of the optical element according to one embodiment.

The examples shown in FIG. 4 to FIG. 6 produce the optical element 5 in an axially symmetrical shape around the optical axis of the optical element 5. While being pointed at a subject, a site close to the subject in the optical element 5 is referred to as a front end side, whereas a site close to an image is referred to as a rear end side. Described in the present embodiment is the example in which optical element 5 is produced by stacking the resin structures in order from the rear end side.

FIG. 4 is an explanatory drawing to show an example of a step of forming a part of the base portion 41 of the optical element 5 from a resin material. The subsequent drawings illustrate the cross section of the formed resin structure when being cut at a surface including the optical axis of the optical element 5.

First, while discharging the first discharge amount of droplets to the molding surface of the stage 3, the 3D printer irradiates the droplets 31 with ultraviolet light by the ultraviolet-rays lamp 13, thereby forming a part of the base portion 41 of the optical element 5.

The rear end side of the base portion 41 is formed in a shape corresponding to the molding surface of the stage 3. According to this example, the rear end side of the base portion 41 is formed in the same plane as the molding surface. For example, it is possible to form a curved surface on the rear end side of the base portion 41 by arranging a base material having a curved surface on a molding surface and forming a resin structure on the curved surface of the base material.

FIG. 5 is an explanatory drawing to show an example of a step of forming a part of the surface portion 42 of the optical element 5 from a resin material. While discharging the second discharge amount of droplets 32 to the upper surface of the base portion 41, the 3D printer 1 irradiates the droplets 32 with ultraviolet light by means of the ultraviolet-rays lamp 13, thereby forming the surface portion 42 of the optical element 5.

FIG. 6 is an explanatory drawing to show an example of the optical element 5 formed of a resin material. The 3D printer 1 forms a curved surface 43 having a predetermined curvature corresponding to three-dimensional data on the surface of the surface portion 42.

Figure 7:
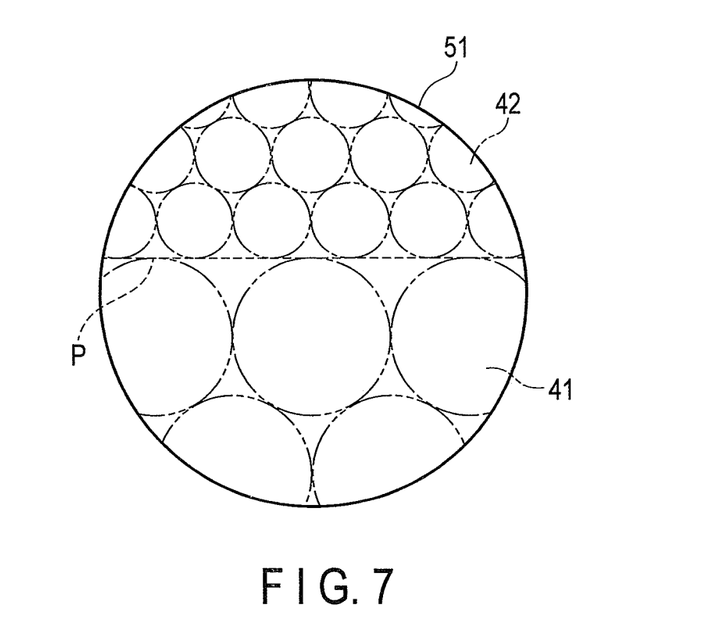
FIG. 7 is a view to explain an example of a resin structure of the optical element according to one embodiment.
Figure 8:
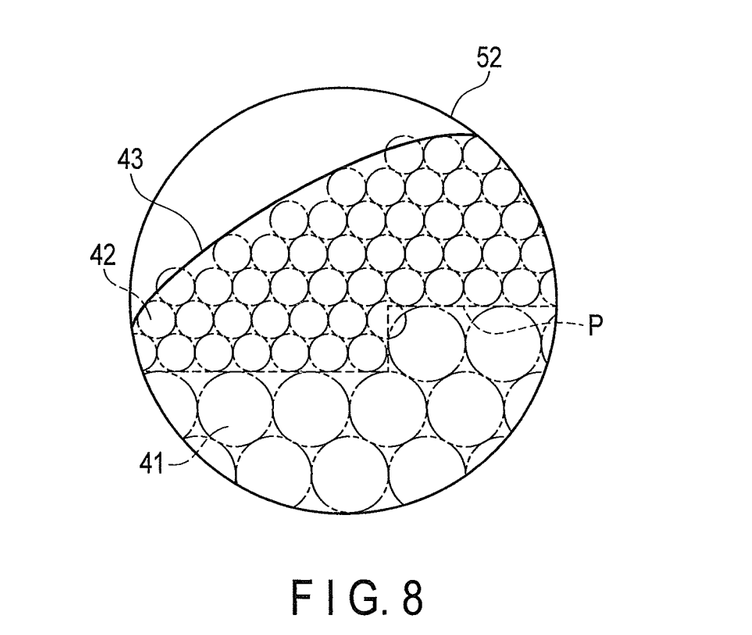
FIG. 8 is a view to explain an example of a resin structure of the optical element according to one embodiment.

FIG. 7 and FIG. 8 are enlarged views showing a resin structure in the vicinity of a boundary P between the base portion 41 and the surface portion 42. FIG. 7 is an enlarged view of a resin structure 51 in which the boundary P between the base portion 41 and the surface portion 42 is formed in a planar shape. FIG. 8 is an enlarged view of a curved surface 43 and a resin structure 52 in which the boundary P between the base portion 41 and the surface portion 42 is formed stepwise. The circular two-dot chain lines in FIG. 7 and FIG. 8 schematically show droplets. In practice, droplets are integrated with the resin structure at the landing position after landing, and cured.

As shown in FIG. 7 and FIG. 8, since the base portion 41 is formed from the droplets 31 having a larger discharge amount than that of the surface portion 42, a resin structure is formed faster in comparison to the surface portion 42. On the other hand, since the surface portion 42 is formed from the droplets 32 having a smaller discharge amount than that of the base portion 41, a finer resin structure is formed in comparison to the base portion 41. As a result, although the surface portion 42 requires stacking of a plurality of layers to form a resin structure having the height equal to the height of one layer of the base portion 41, the curved surface 43 having higher shape accuracy than the base portion 41 is formed on the surface. As described above, the 3D printer 1 forms the base portion 41 not requiring shape accuracy at a high speed with the droplets 31 of the first discharge amount, and forms with high accuracy the surface portion 42 requiring the shape accuracy on the base portion 41 with the droplets 32 of the second discharge amount smaller than the first discharge amount. As a result, the 3D printer 1 can achieve both high shape accuracy and shortening of time required for production.

Second Embodiment

Next, a specific method of producing an optical element 5 according to the second embodiment will be described with reference to FIG. 9 to FIG. 13. The same structures as those in the first embodiment are assigned with the same reference numerals, and a detailed description of such structures are omitted.

Figure 9:
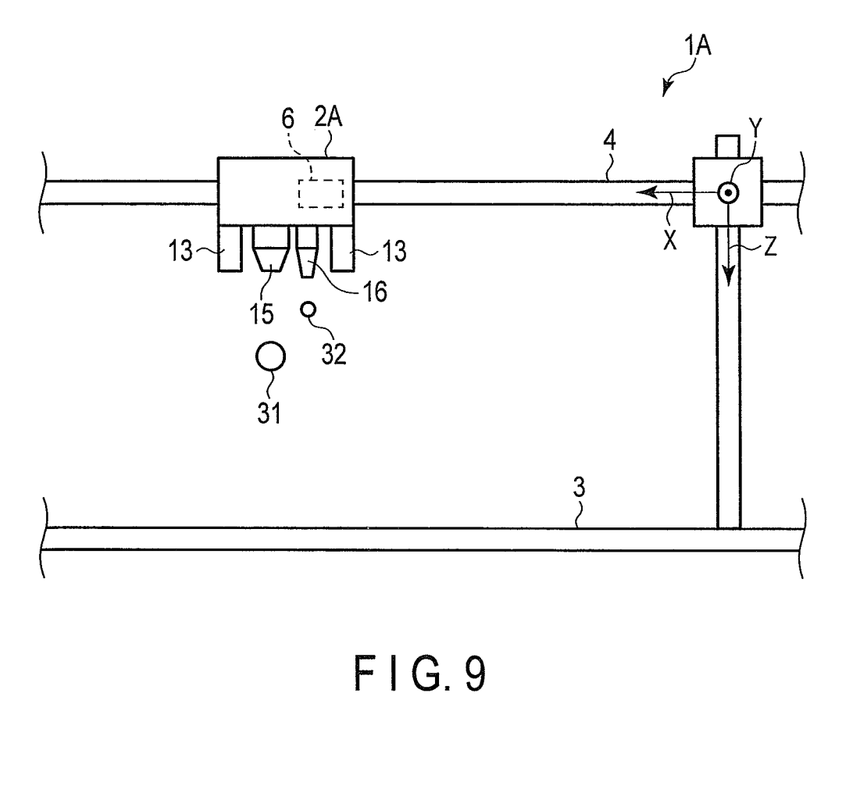
FIG. 9 is a view to explain an example of a 3D printer according to another embodiment.

FIG. 9 is an explanatory drawing to explain an example of a 3D printer 1A according to the second embodiment. The 3D printer 1A is an apparatus for manufacturing an optical element 5. The 3D printer 1A includes a print head 2A, a stage 3, a positioning mechanism 4, and a control unit 6.

The print head 2A discharges liquid resin as droplets. The print head 2A includes a first nozzle 15, a second nozzle 16, and an ultraviolet-rays lamp 13. The second nozzle 16 is provided in a manner that the distal end is closer to the molding surface of the stage 3 relative to the distal end of the first nozzle 15. The print head 2A further includes a pressure chamber (not shown) filled with the transmissive material. The pressure chamber may be provided for each nozzle, or a plurality of nozzles may be communicated with a single pressure chamber. For example, the print head 2A controls the pressure in the pressure chamber in accordance with the three-dimensional data to send out the liquid resin in the pressure chamber to the first nozzle 15 or the second nozzle 16. The print head 2A switches the nozzle that discharges droplets between the first nozzle 15 and the second nozzle 16, in accordance with the amount of droplets discharged.

The 3D printer 1A forms layers of the resin structure by moving the print head 2A in the X direction and the Y direction by means of the positioning mechanism 4 while discharging droplets from the print head 2A to the stage 3. Specifically, the 3D printer 1A moves the print head 2A by the positioning mechanism 4 to a position corresponding to coordinates of three-dimensional data. Furthermore, the 3D printer 1A determines the amount of droplets discharged according to the shape data of the coordinates. For example, according to the shape date for each coordinate, the 3D printer 1A determines whether to discharge no droplets, discharge droplets in the first discharge amount, or discharge droplets in the second discharge amount, and according to a result of this determination, the 3D printer 1A operates the print head 2A. That is, the 3D printer 1 forms layers by switching the amount of droplets to be discharged between the first discharge amount and the second discharge amount according to the three-dimensional data. The 3D printer 1A forms resin layers while moving the print head 2A in the Z direction by the positioning mechanism 4, thereby forming a three-dimensional object with a stacked structure in which the aforementioned layers are stacked.

Figure 10:
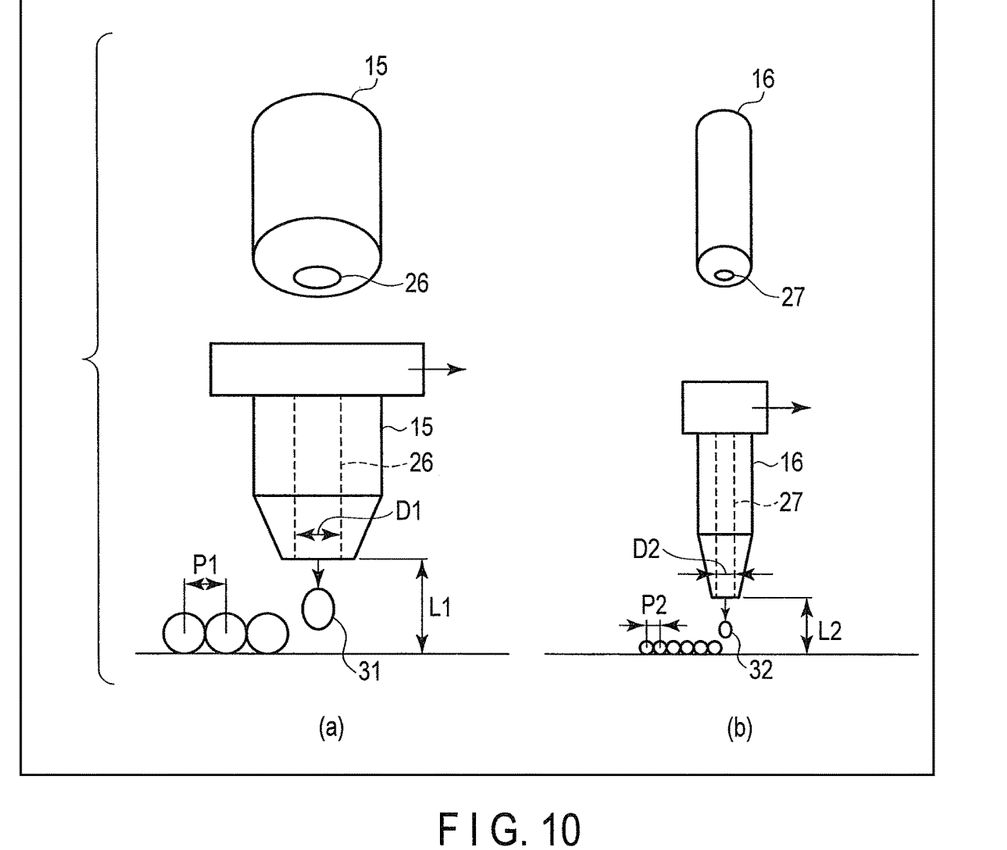
FIG. 10 is a view to explain a configuration example of a nozzle according to another embodiment.

FIG. 10 is an explanatory drawing to explain a configuration example of the distal end of the first nozzle 15 or the second nozzle 16, and a positional relationship of each nozzle. FIG. 10(a) shows a configuration example of the first nozzle 15, and a positional relationship between the first nozzle 15 and the molding surface of the stage 3. FIG. 10(b) shows a configuration example of the second nozzle 16, and a positional relationship between the second nozzle 16 and the molding surface of the stage 3.

The 3D printer 1A changes, in accordance with the amount of droplets discharged, the amount of movement made by the positioning mechanism 4 when the first nozzle 15 or the second nozzle 16 of the print head 2A is moved within the plane parallel to the molding surface of the stage 3. Furthermore, in accordance with the amount of droplets discharged, the 3D printer 1A changes, by the positioning mechanism 4, the distance between the first nozzle 15 or the second nozzle 16 of the print head 2A and the landing position of droplets in the direction orthogonal to the molding surface of the stage 3.

As shown in FIG. 10(a), the first nozzle 15 includes a first opening 26 having a first opening area. The first opening 26 is a circular hole having a diameter D1. When discharging the first discharge amount of droplets 31, the 3D printer 1A discharges the droplets 31 from the first nozzle 15. In this case, the 3D printer 1A moves the first nozzle 15 to a position in which the distance between the first nozzle 15 and the droplet landing position becomes a first distance L1. The 3D printer 1A discharges the first discharge amount of droplets 31 from the first nozzle 15 while moving the variable nozzle 15 in the X direction or the Y direction by the first interval P1 corresponding to the first resolution.

As shown in FIG. 10(b), the second nozzle 16 includes a second opening 27 having a second opening area. The second opening 27 is a circular hole having a diameter D2. When discharging the second discharge amount of droplets 32, the 3D printer 1A discharges the droplets 32 from the second nozzle 16. In this case, the 3D printer 1A moves the second nozzle 16 to a position in which the distance between the second nozzle 16 and the droplet landing position becomes a second distance L2. The 3D printer 1A discharges the second discharge amount of droplets 32 from the second nozzle 16 while moving the second nozzle 16 in the X direction or the Y direction by the second interval P2 corresponding to the second resolution.

The vertical fluctuation of the print head 2 caused when the print head 2A is moved increases in accordance with the movement distance in the X direction or the Y direction. However, as described above, if the print head 2A is moved by the first interval P1 wider than the second interval P2, the print head 2A is positioned so that the distance between the first nozzle 15 and the droplet landing position of droplets 31 becomes the first distance L1 longer than the second distance L2, thereby preventing the first nozzle 15 from coming into contact with the resin structure due to the vertical fluctuation of the print head 2A.

The relationship of the diameter D1 of the opening 26 of the first nozzle 15, the first interval P1 that is an interval of movement of the first nozzle 15, and the first distance L1 that is a distance between the first nozzle 15 and the landing position to the diameter D2 of the opening 27 of the second nozzle 16, the second interval P2 that is an interval of movement of the second nozzle 16, and the second distance L2 that is the distance between the second nozzle 16 and the landing position, desirably satisfies either the first relationship in which $0.5<(L1/D1)/(L2/D2)<2$, or the second relationship in which $0.5<(P1/L1)/(P2/L2)<2$. It is more desirable to satisfy both the first relationship and the second relationship. The diameter D1 is desirably four or more times greater than the diameter D2. That is, it is desirable that the first opening area is, for example, approximately 10 times larger than the second opening area. If the first opening area is approximately 10 times larger than the second opening area, it is possible to achieve both a case where emphasis is placed on stacking time and a case where emphasis is placed on shape accuracy.

Next, a specific method of producing the optical element 5 according to the second embodiment will be described with reference to FIG. 11 to FIG. 13. The 3D printer 1A discharges droplets from the first nozzle 15 and the second nozzle 16 while moving the print head 2A in the X direction and the Y direction, and forms layers of the transparent resin structure on the stage 3. The 3D printer 1A stacks layers of the resin structure while moving the print head 2A in the Z direction to thereby form the optical element 5 including a base portion 41 and a surface portion 42.

Similar to the first embodiment, the 3D printer 1A of the present embodiment controls the operations of the print head 2A and the positioning mechanism 4 so as to form the base portion 41 from the first discharge amount of droplets 31, and controls the operations of the print head 2A and the positioning mechanism 4 so as to form the surface portion 42 having the curved surface 43 from the second discharge amount of droplets 32.

Specifically, while moving the print head 2A by the positioning mechanism 4, the 3D printer 1A discharges the first discharge amount of droplets 31 from the first nozzle 15 when the print head 2A reaches a position in which the printer heat 2A is to form the base portion 41 of the optical element 5. Moreover, while moving the print head 2A by the positioning mechanism 4, the 3D printer 1A discharges the second discharge amount of droplets 32 from the second nozzle 16 when the print head 2A reaches a position in which the print head 2A is to form the surface portion 42 having the curved surface 43 of the optical element 5.

Figure 11:
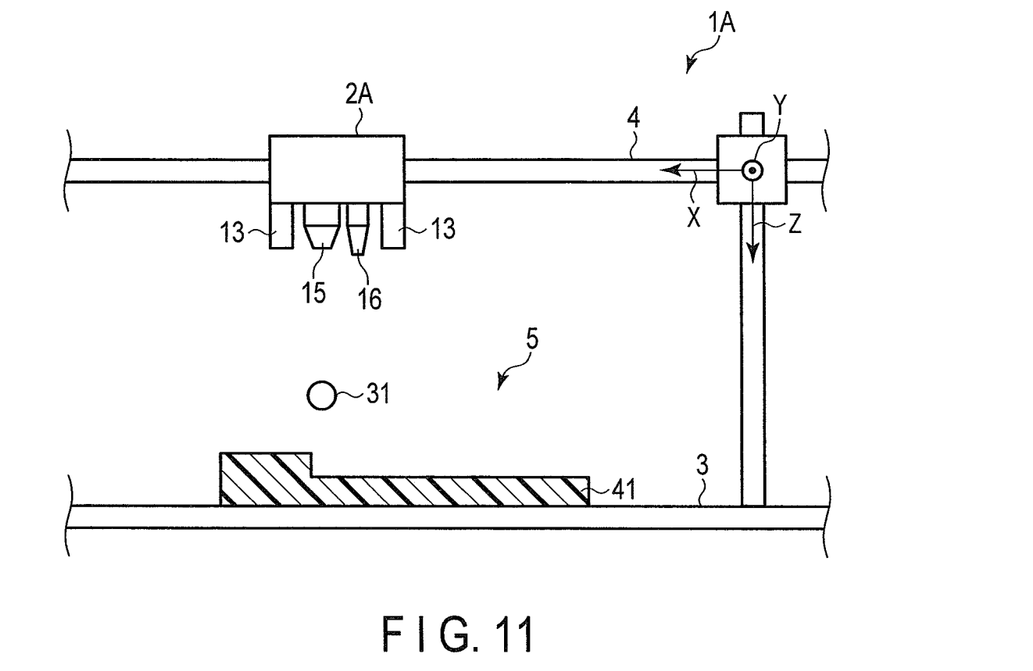
FIG. 11 is view to explain an example of a step of forming a part of a base portion of an optical element according to another embodiment.
Figure 12:
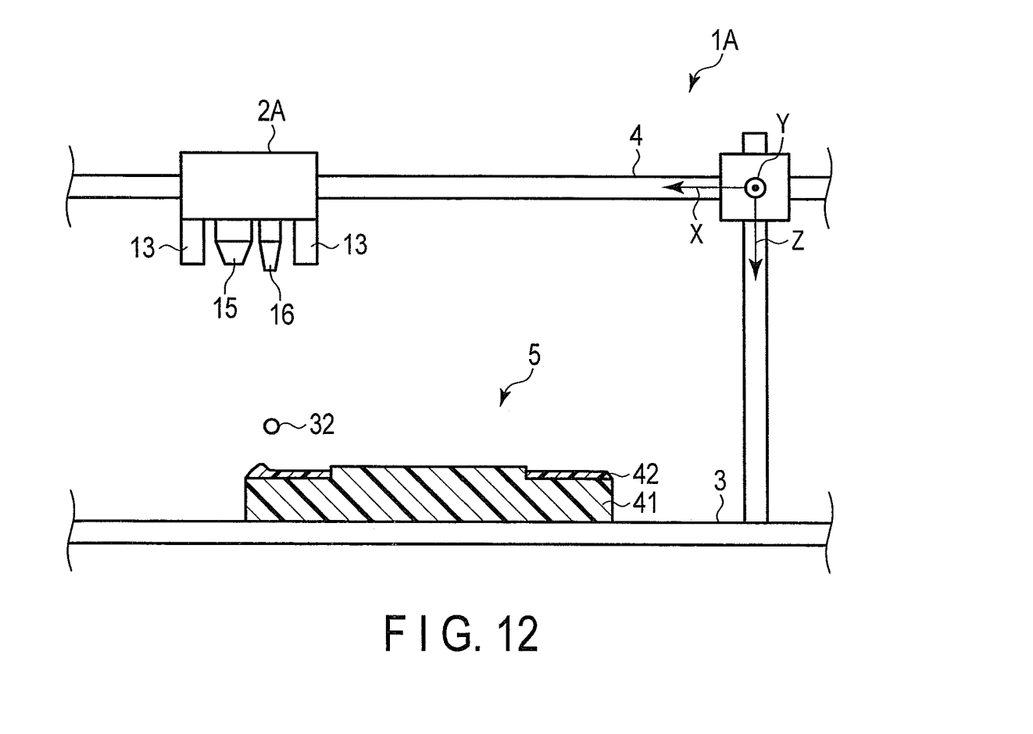
FIG. 12 is a view to explain an example of a step of forming a part of a surface portion of the optical element according to another embodiment.
Figure 13:
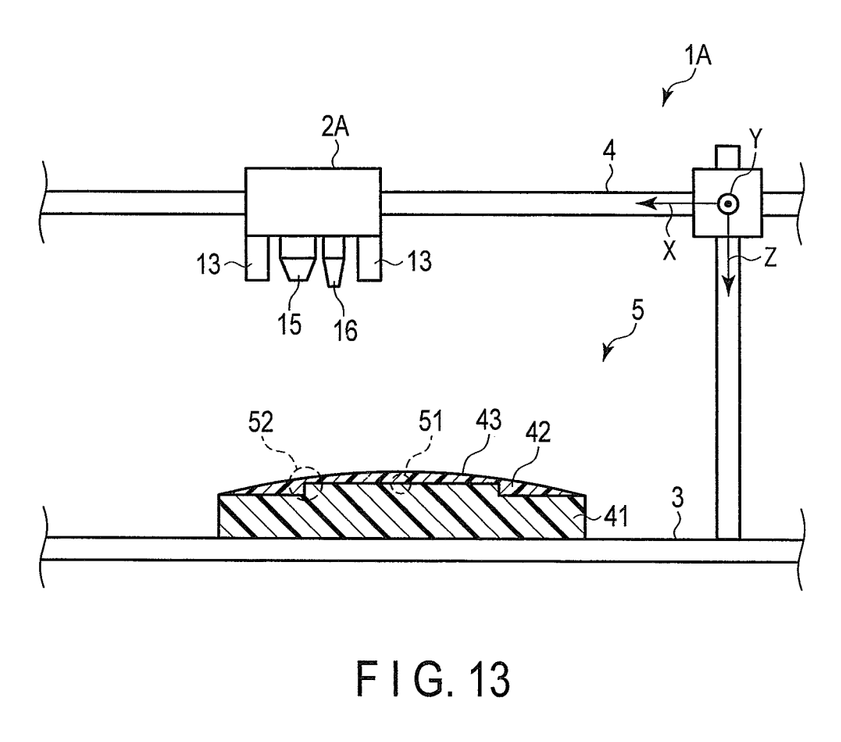
FIG. 13 is a view to explain an example of the optical element according to another embodiment.

The example shown in FIG. 11 to FIG. 13 produces the optical element 5 in an axially symmetrical shape around the optical axis of the optical element 5. While being pointed at a subject, a site close to the subject in the optical element 5 is referred to as a front end side, whereas a site close to an image is referred to as a rear end side. Described in the present embodiment is the example in which the optical element 5 is produced by stacking the resin structures in order from the rear end side.

FIG. 11 is an explanatory drawing showing an example of a step of forming a part of the base portion 41 of the optical element 5 from a resin material. The subsequent drawings illustrate the cross section of the formed resin structure when being cut at a surface including the optical element 5.

First, while discharging the first discharge amount of droplets 31 from the first nozzle 15 to the molding surface of the stage 3, the 3D printer 1A irradiates the droplets 31 with ultraviolet light by the ultraviolet-rays lamp 13, thereby forming a part of the base portion 41 of the optical element 5.

FIG. 12 is an explanatory drawing showing an example of a step of forming a part of the surface portion 42 of the optical element 5 from a resin material. While discharging the second discharge amount of droplets 32 from the second nozzle 16 to the upper surface of the base portion 41, the 3D printer 1A irradiates the droplets 32 with ultraviolet light by the ultraviolet-rays lamp 13, thereby forming the surface portion 42 of the optical element 5.

FIG. 13 is an explanatory drawing showing an example of the optical element 5 formed from a resin material. The 3D printer 1A forms a curved surface 43 having a predetermined curvature corresponding to three-dimensional data on the surface of the surface portion 42.

With the above-described configuration as well, the 3D printer 1 forms the base portion 41 not requiring shape accuracy at a high speed with the first discharge amount of droplets 31, and forms with high accuracy the surface portion 42 requiring shape accuracy on the base portion 41 with the second discharge amount of droplets 32 smaller than the first discharge amount. As a result, the 3D printer 1 can achieve both high shape accuracy and shortening of the time required for production.

Described in the above embodiments is that the optical element 5 forms an axially symmetrical shape around the optical axis. However, the embodiments are not limited to this configuration. According to existing methods, lenses are formed into a circular shape in order to make it easy to grind and polish glass or resin during production. However, in the case of producing optical elements 5 by the 3D printer 1, optical elements 5 in any shape can be produced through similar steps.

For example, an imaging element may be formed in a shape corresponding to an effective area of the optical element 5 determined by the shape of the imaging element. According to the configuration described above, it is possible to cut light which passes outside the effective area of the optical element, and to prevent generation of unnecessary light. In addition, the optical element 5 can be made more compact than an optical element using a circular lens. Since the optical element 5 can be made compact, it is possible to reduce resin materials required for the production of the optical element 5.

In the above embodiments, the example in which the optical element 5 is produced by stacking the resin structures in order from the rear end side of the optical element 5 was described. However, the embodiments are not limited to this configuration. The direction of stacking resin structures may be any direction.

The present invention is not limited to the above-described embodiments and can be embodied in practice by modifying the structural elements without departing from the gist of the invention. In addition, various inventions can be made by suitably combining the structural elements disclosed in connection with the above embodiments. For example, some of the entire structural elements described in the embodiments may be omitted. In addition, the structural elements between different embodiments may be combined as appropriate.

The invention claimed is:

1. A method of producing an optical element, the method comprising:
forming a base portion that supports a curved surface of the optical element by discharging a transmissive material that allows transmission of light in a first amount, the base portion having a top surface and a side surface, and the top surface having an unlevel portion; and
forming the curved surface by discharging, to the top surface of the base portion, the transmissive material in a second discharge amount smaller than the first discharge amount such that the curved surface covers the top surface of the unlevel portion while the side surface of the base portion is left exposed.

2. The method according to claim 1, further comprising switching a discharge amount between the first discharge amount and the second discharge amount in accordance with three-dimensional data that indicates a shape of the optical element.

3. The method according to claim 1, further comprising switching a discharge amount by:
determining whether to discharge the transmissive material in the first discharge amount or the second discharge amount in accordance with three-dimensional data that indicates a shape of the optical element, and
switching between the first discharge amount and the second discharge amount in accordance with a result of the determining.

4. The method according to claim 3, wherein the switching the discharge amount switches between the first discharge amount and the second discharge amount by deforming a shape of an opening of a nozzle that discharges the transmissive material, and switching an area of the opening between a first opening area and a second opening area smaller than the first opening area.

5. The method according to claim 3, wherein the switching the discharge amount switches between the first discharge amount and the second discharge amount by switching a nozzle that discharges the transmissive material between a first nozzle provided with an opening having a first opening area and a second nozzle provided with an opening having a second opening area smaller than the first opening area.

6. The method according to claim 3, further comprising positioning to move a nozzle that discharges the transmissive material in accordance with the three-dimensional data,
wherein the positioning changes a resolution of a moving distance of the nozzle in accordance with an amount of the transmissive material discharged.

7. The method according to claim 3, further comprising positioning to adjust a distance between a nozzle that discharges the transmissive material in accordance with the three-dimensional data and a landing position of droplets of the transmissive material discharged from the nozzle,
wherein the positioning changes a distance between the nozzle and the landing position in accordance with an amount of the transmissive material discharged.

8. An apparatus for producing an optical element, the apparatus comprising:
a discharger that discharges a transmissive material that allows transmission of light in a first discharge amount or a second discharge amount smaller than the first discharge amount; and
a controller that:
acquires three-dimensional data,
controls the discharger to form a base portion that supports a curved surface of the optical element by discharging the transmissive material in the first discharge amount based on the three-dimensional data, the base portion having a top surface and a side surface, and the top surface having an unlevel portion and
controls the discharger to form the curved surface by discharging the transmissive material in the second discharge amount to the top surface of the base portion based on the three-dimensional data such that the curved surface covers the top surface of the unlevel portion while the side surface of the base portion is left exposed.

9. The apparatus according to claim 8, wherein the discharger switches between the first discharge amount and the second discharge amount by deforming a shape of an opening of a nozzle that discharges the transmissive material, and switching an area of the opening between a first opening area and a second opening area smaller than the first opening area.

10. The apparatus according to claim 8, wherein the discharger comprises a first nozzle provided with an opening having a first opening area and a second nozzle provided with an opening having a second opening area smaller than the first opening area,
  wherein the discharger switches between the first discharge amount and the second discharge amount by switching a nozzle that discharges the transmissive material between the first nozzle and the second nozzle under control of the controller.

11. The apparatus according to claim 8, further comprising a positioning mechanism that moves a nozzle that discharges the transmissive material in accordance with the three-dimensional data,
  wherein the controller changes a resolution of a moving distance of the nozzle in accordance with an amount of the transmissive material discharged.

12. The apparatus according to claim 8, further comprising a positioning mechanism that adjusts a distance between a nozzle that discharges the transmissive material in accordance with the three-dimensional data and a landing position of droplets of the transmissive material discharged from the nozzle,
  wherein the controller changes a distance between the nozzle and the landing position in accordance with an amount of the transmissive material discharged.

* * * * *